(12) United States Patent
Hazell et al.

(10) Patent No.: US 6,395,320 B1
(45) Date of Patent: May 28, 2002

(54) TWO-COMPONENT PACKAGED FOOD PRODUCTS

(75) Inventors: Nicholas John Gerard Hazell, Rotterdam; Raymond Alexander Van Bussell, Spijkenisse; Ralph Albert Jerome, Rotterdam; Marcel Christian Anthony Velthuis, Zwijndrecht, all of (NL); Martin Conrad Ager, Nottingham (GB); Nancy Waiman Quan, Beijing (CN)

(73) Assignee: Masterfoods, C.V., Oud-Beijerland (NL)

( * ) Notice: Subject to any disclaimer, the term of this patent is extended or adjusted under 35 U.S.C. 154(b) by 0 days.

(21) Appl. No.: 09/355,643

(22) PCT Filed: Jan. 29, 1998

(86) PCT No.: PCT/GB98/00284

§ 371 (c)(1),
(2), (4) Date: Dec. 7, 1999

(87) PCT Pub. No.: WO98/33399

PCT Pub. Date: Jan. 29, 1998

(30) Foreign Application Priority Data

Jan. 30, 1997 (GB) .............................................. 9701861
Jan. 30, 1997 (GB) .............................................. 9701862
Sep. 9, 1997 (GB) .............................................. 9719139

(51) Int. Cl.[7] .............................. A23L 1/39; A23P 1/08; B65D 77/08
(52) U.S. Cl. ...................... 426/392; 426/106; 426/112; 426/129; 426/115; 426/394; 426/407; 426/574; 426/589; 426/602; 426/615; 426/89
(58) Field of Search ........................... 426/76, 89, 106, 426/120, 112, 113, 138, 102, 103, 114, 127, 392, 415, 589, 602, 115, 90, 92, 394, 574, 129, 407

(56) References Cited

U.S. PATENT DOCUMENTS

| | | | | |
|---|---|---|---|---|
| 1,852,941 A | | 4/1932 | Stewart | |
| 3,642,499 A | * | 2/1972 | Castell | ................... 99/171 CP |
| 3,681,094 A | * | 8/1972 | Rogers et al. | ................. 426/92 |

(List continued on next page.)

FOREIGN PATENT DOCUMENTS

| | | | | |
|---|---|---|---|---|
| DE | 29611984 | 11/1996 | | ...................... 1/48 |
| EP | 0002037 | 5/1979 | | |
| EP | 0451491 | 10/1991 | | ........................ 1/8 |

(List continued on next page.)

*Primary Examiner*—Milton I. Cano
*Assistant Examiner*—Robert Madsen
(74) *Attorney, Agent, or Firm*—Fulbright & Jaworski L.L.P.

(57) ABSTRACT

The invention provides two-component shelf-stable packaged food products, especially packaged sauce products. The products comprise a container, a first food component filling a first region of the container, and a second food component filling a second region of the container, wherein the second food component either directly contacts the first food component or is separated therefrom by an edible interfacial layer. The second food component can be decanted off the first food component, and the second and first food components are adapted for use in combination in sequential food preparation steps. Preferably, the first food component is a thick sauce concentrate and the second food component is a vegetable oil containing chopped vegetable pieces. The vegetable oil and vegetable pieces are decanted and fried, prior to addition of the sauce concentrate, thereby achieving improved organoleptic properties.

37 Claims, 3 Drawing Sheets

U.S. PATENT DOCUMENTS

| | | | | |
|---|---|---|---|---|
| 3,808,340 A | * | 4/1974 | Palmer | 426/92 |
| 4,094,996 A | * | 6/1978 | Sakakibara et al. | 426/115 |
| 4,163,808 A | | 8/1979 | DePaolis | 426/613 |
| 4,874,618 A | | 10/1989 | Seaborne et al. | 426/76 |
| 4,952,414 A | | 8/1990 | Kaufman et al. | 426/93 |
| 5,104,679 A | | 4/1992 | Jurcso | 426/602 |
| 5,417,998 A | | 5/1995 | Scheibner et al. | 426/615 |
| 5,494,692 A | | 2/1996 | Beyer et al. | 426/393 |
| 5,501,867 A | | 3/1996 | Creehan et al. | 426/601 |
| 5,529,794 A | * | 6/1996 | Fultz | 426/115 |
| 6,203,831 B1 | * | 3/2001 | Eder et al. | 426/103 |

FOREIGN PATENT DOCUMENTS

| | | | | |
|---|---|---|---|---|
| EP | 0638488 A1 | * | 2/1995 | |
| EP | 0738472 | | 4/1995 | |
| EP | 0686354 | | 12/1995 | 1/8 |
| FR | 2063417 | | 9/1971 | |
| GB | 1572033 | | 7/1980 | 85/72 |
| GB | 1583351 | | 1/1981 | 3/2 |
| GB | 2224192 | | 5/1990 | 1/48 |
| GB | 2242815 | | 10/1991 | 1/8 |
| GB | 2281187 | | 3/1995 | 1/8 |
| GB | 9701861.8 | | 1/1997 | |
| GB | 9701862.6 | | 1/1997 | |
| JP | 60118163 | | 6/1985 | 1/24 |
| JP | 61001349 A | * | 1/1986 | |
| JP | 6111660 A | * | 5/1986 | 426/89 |
| JP | 62296859 | | 12/1987 | 1/24 |
| JP | 63019747 A | * | 5/1988 | 426/93 |
| JP | 05199844 | | 8/1993 | 1/6 |
| JP | 360091961 A | * | 5/1995 | 426/106 |
| JP | 09299052 | * | 11/1997 | |
| WO | 9201394 | | 2/1992 | 1/8 |
| WO | 9508492 | | 3/1995 | 77/8 |
| WO | 9607334 | | 3/1996 | 1/221 |
| WO | 9625857 | | 8/1996 | 19/16 |

* cited by examiner

FIG. 2

TWO-COMPONENT PACKAGED FOOD PRODUCTS

This application is the National Stage of International Application No. PCT/GB98/00284, filed Jan. 29, 1998.

FIELD OF THE INVENTION

The present invention relates to two-component shelf-stable packaged food products, methods of manufacture thereof, and use thereof in the preparation of foods.

BACKGROUND OF THE INVENTION

Some two-component packaging formats are already known. For example, it is known to provide thermo-formed plastic trays having two or more recesses for receiving different food products, the trays being sealed by a thermally bonded membrane across the top of the recesses. However, it is not economic to thermo-form glass containers into complex shapes of this type.

It is also known to provide packages in which two food products in the semi-solid or gel form are packaged separately, but in physical contact in the same space. One example is the packaging of fruit yogurts in which a carton has a layer of fruit jelly in the bottom, and a layer of yogurt is provided on top of the fruit jelly. Another example is the packaging of peanut butter and jelly together in a single jar. Such arrangements have hitherto only been used with non-shelf-stable products such as yogurt, or with shelf-stable products such as peanut butter or jelly that do not require heat stabilization to render them shelf stable. Such products would undergo degradation and mixing if they were heated to 90° or above to render them shelf stable.

It is also known to provide a packaged pasta sauce comprising a layer of acid-stabilized vegetable pieces, such as chopped olives, on top of the sauce in a glass jar, providing an attractive visual appearance. Such "stir-in" arrangements are intended only to provide an attractive visual appearance on the shelf, and are not suitable for use in a two-step cooking process. The chopped vegetables are merely mixed into the sauce when the sauce is poured from the glass jar and reheated. Any attempt to cook the acid-stabilized (pickled) vegetables separately gives a product having very poor organoleptic properties.

It would be especially desirable to provide a two-component sauce package, such as a two-component pasta sauce package. Such a package would preferably comprise a water-based component containing water and aqueous components such as tomato paste, salt, sugar etc., packaged together with an oil-based component, preferably containing chopped vegetables, such as onion or garlic and/or meat. These chopped pieces present in the oil could then be fried initially to accomplish high-temperature flavour development and browning reactions required for vegetables and/or meat, prior to addition of the water-based components to complete preparation of the product. This contrasts with existing packaged shelf-stable sauce products, most of which merely contain raw or blanched vegetable pieces in an aqueous tomato base, the base and vegetable pieces being heated together when the sauce is reheated prior to use. Such sauces do not usually have the desirable "home-cooked", "restaurant-quality" organoleptic properties of a sauce prepared by sequential frying and mixing steps, as described above.

It would also be desirable to provide a two-component marinade product, wherein the first component is a conventional meat or vegetable sauce and the second component is a marinade. In use, the marinade will be applied first to a food product, preferably meat. After the food product has been marinated, it would be mixed with the first sauce component for further cooking.

Packaged sauces are generally required to be shelf-stable. That to say, the packaged product should be capable of storage at ambient temperature for at least one month, preferably at least 3 months, and more preferably at least 6 months without significant spoilage. In order to achieve this, it is necessary for the food product to be packaged in a substantially oxygen-and micro-organism-impermeable package, such as a glass jar. It is also necessary for the food product to be sterilized or acid pasteurised. Sterilization refers to autoclaving the food product at a temperature above 120° C. for at least five minutes, and usually also requires rotational mixing of the packaged product. Acid pasteurization refers to treating a food product having a pH of 4.5 or less, preferably 4.3 or less at a temperature of at least 80° C., preferably 90 to 95° C. for at least about five minutes. Acid pasteurization does not require rotational mixing of the packages, but may require acidification of the food product with a food-acceptable acid such as lactic acid, citric acid, alginic acid, acetic acid, or the like to achieve the necessary pH.

It is an object of the present invention to provide a shelf-stable two-component packaged food product, such as a sauce, in which the two components are packaged in the same container space; and which allows the first and second components to be used in combination for sequential food preparation steps.

Preferably, the product is a sauce, such as a pasta sauce, a rice sauce such as a risotto, a meat sauce or an oriental-style sauce. The product may also be a soup.

SUMMARY OF THE INVENTION

The present invention provides a two-component shelf-stable packaged food product comprising: a container having substantially rigid walls and an opening for filling and emptying the container; a first food component filling a first region of the container remote from the opening; a second food component different from the first food component and filling a second region of the container adjacent to the opening; wherein the second food component either directly contacts the first food component or is separated therefrom only by an edible interfacial layer, and wherein the second food component can be decanted off the first food component through the opening, the second and first food components being adapted for use in combination in sequential food preparation steps.

BRIEF DESCRIPTION OF THE DRAWINGS

A better understanding of the invention can be obtained when the detailed description of exemplary embodiments set forth below is reviewed in conjunction with the accompanying drawings, in which.

DETAILED DESCRIPTION OF PREFERRED EMBODIMENTS

The term "use in combination in sequential food preparation steps" implies that a first food preparation step, usually cooking by the application of heat, is preferred on the second food component, and that this is followed by a second food preparation step, different from the first food preparation step and making use of the first food component, which is usually the admixture and heating of the first food component with the product of the first food preparation step. The term "food preparation step" encompasses heating and marinading steps, but does not encompass a simple mixing of components.

Preferably, the first food component is an aqueous sauce component such as a tomato sauce, a concentrated meat or vegetable stock, optionally containing fats or oils as a dispersed phase in a continuous aqueous phase. Preferably, the pH of the first food component is less than 4.5, preferably 4.3 or less to permit acid stabilization of the first food product without autoclaving.

Preferably, the second food component is an edible oil based component. The term "edible oil based component" encompasses water-in-oil emulsions and solid suspensions in oil. The edible oil preferably comprises a vegetable oil, more preferably corn oil or sunflower seed oil. The edible oil component may further comprise a flavouring oil such as olive oil, sesame oil and the like. The edible oil preferably contains herbs, spices or other lipophilic flavouring essences.

More preferably, the second food component is an edible oil having vegetable pieces and/or herbs and spices distributed therein. Preferred vegetable pieces are selected from the group consisting of onions, garlic, carrots, peppers, eggplant, or mixtures thereof. Preferably, the vegetable pieces are raw or blanched but not substantially cooked or pickled. Typically, the vegetable pieces have dimensions of the order of 3–20 mm, and preferably the vegetable and herb pieces occupy from 20% to 80% of the volume occupied by the second food component, more preferably 30% to 60% of the volume occupied by the second component. In certain embodiments, the second food component may alternatively or additionally contain meat pieces.

Normally, the solid vegetable pieces must be acidified with a food-acceptable acid to render them susceptible to acid pasteurization. Suitable food-acceptable acids include lactic, citric, acetic and alginic acids. Preferably, the pH of the acidified meat or vegetable pieces is less that 4.5, more preferably less than 4.3.

Here and elsewhere in the specification, the pH of a food component is determined by macerating 100 grams of the food component in 100 ml of deionised water, followed by measuring the pH of the resulting liquid using a glass electrode. Uniformity of the acidification is confirmed by sectioning selected solid vegetable pieces and applying a pH contact electrode to different regions of the cross-section.

For example, in sauce or soup products according to the present invention, the layer of edible oil containing the chopped vegetable pieces is decanted into a flying pan and the vegetables are then fried in the oil to develop desirable flavors and textures due to high temperature browning of the vegetables in the oil, thereby achieving a more home-cooked or restaurant-quality taste in the finished product. It is well known that these browning reactions include so-called Maillard reactions, in which carbohydrates such as sugars react with proteins present in the food.

It has been found that improved flavor development is achieved if the vegetable pieces in the second food component comprise added reducing sugars, especially glucose, since the reducing sugars give especially strong Maillard reactions. Furthermore, the presence of the reducing sugar appears to reduce the perceived acid taste of the acid-stabilized vegetable pieces. Finally, the presence of reducing sugar appears to reduce the popping and spitting observed during frying, thereby making the packaged food product more user-friendly. This is thought to be because the step of soaking the vegetable pieces in a reducing sugar solution to infuse them with reducing sugar reduces the total water content of the vegetable pieces by osmosis.

Therefore, the vegetable pieces in the second food component in the preferred embodiments of the present invention preferably further comprise added reducing sugar, more preferably glucose. The reducing sugar can be added before, after, or preferably simultaneously with the food-acceptable acid simply by soaking or blanching the vegetable pieces in a sugar solution.

Once the vegetables have been sufficiently browned in the oil of the second food component, the user may optionally add additional meat or other components for browning at high temperature, in similar fashion as if they were preparing a conventional meat sauce. Alternatively the meat may be present already in the second food component, although this is not usually preferred. In any case, once the frying steps are completed, the first food component (aqueous sauce or soup concentrate) is shaken or spooned from the container into the cooked second food component, with mixing and heating to produce a finished sauce for pasta, rice, meat or the like, or a finished soup, having home-cooked or restaurant-quality organoleptic properties.

Since the second food component is oil-based and the first food component is water-based, it has been found to be advantageous to include an emulsifier in the edible oil of the second food component. This ensures rapid and complete mixing of the two food components with improved organoleptic properties, mouthfeel and visual appearance in the product. The preferred emulsifier is lecithin, preferably present in the edible oil in an amount of 0.05% by weight to 0.5% by weight, based on the weight of the edible oil in the second food component. The lecithin has also been found to reduce popping and spitting of the vegetables during frying.

In alternative preferred embodiments, the present invention provides a risotto sauce product, wherein the second food component comprises oil and vegetable meat or herb pieces as herein before described for the pasta or cook-in-sauce, but the first food component is an aqueous risotto base concentrate comprising meat or vegetable stock, cheese, emulsified fats, herbs, spices, thickeners and/or wine. In use, the vegetables are fried as be fore. Rice is t hen added and fried in the oil. The risotto base concentrate is added, together with sufficient additional water to hydrate the rice, and cooking is continued with stirring for 10–40 minutes (depending on the type of rice used) to produce the finished risotto.

In alternative preferred embodiments, the present invention provides a soup product, wherein the second food component comprises oil and vegetable, meat or herb pieces as herein before described for the pasta or meat sauce, and the first food component is a concentrated soup component. In use, the oil-based component is fried, optionally with the addition of further meat or vegetables, and the first food component is then added, together with sufficient additional fluid such as stock, cream, water or milk to make up a soup of the desired thickness.

In alternative preferred embodiments of the present invention, namely the marinade sauce embodiments, the edible oil-based second food component is replaced by a liquid marinade, preferably an aqueous marinade. This marinade is decanted onto a food, usually a meat, in a first food preparation step. After allowing sufficient time for marination, the marinated meat is then cooked prior to addition of the first food component (water-based sauce) of the cook-in sauce product.

Preferably, the container is a glass jar. Preferably, the first and second food components are in direct contact across the interior of the jar. Preferably, the first and second food components are substantially mutually immiscible (e.g. one is oil-based and the other is water-based) to inhibit diffusional mixing of the two components. The direct contact between the first and second food components provides an attractive visual appearance to the package, and avoids the expense and potential contamination hazard of providing a physical barrier between the two components.

As previously noted, the first and second food components in the packaged food products according to the present invention are packaged in the same container space, the said components being either in direct contact with one another or being separated only by an edible interfacial layer. Accordingly, the packaged food products according to the present invention preferably further comprise means to inhibit mixing of the first and second food components when the package is being transported, sold or inspected by a prospective purchaser. Preferably, the anti-mixing means also inhibits mixing while the second food component is being decanted off the first food component.

Preferably, the means to inhibit mixing of the first and second components comprises a thickening or gelling agent provided in the first food component, whereby the first food component is thickened or gelled sufficiently to inhibit mixing of the first and second food component during filling and transporting of the two-component package, and during decanting of the second food component. Preferably, the thickening or gelling agent is a hydrocolloid, preferably selected from the group consisting of pectins, alginates, guar gum, gum tragacanth, gum arabic, gelatin, starch, starch derivatives and mixtures thereof. More preferably, the gelling agent comprises pectin gelled with a calcium salt. Preferably the gelling agent is present in an amount of 0.1 to 1.0% by weight.

Preferably, the first component comprises both a gelling agent such as pectin and a conventional thickener such as starch, especially modified corn starch, said thickener being present in an amount of 0.5–1.5% by weight. The starch thickens the first food component both at high temperatures and at low temperatures, unlike the pectin gel which breaks down completely at high temperatures. Thus, the starch ensures that the first food component still has acceptable thickness and mouthfeel at consumption temperatures and heat stabilization temperatures.

The first food component retains sufficient mobility to be spooned or shaken out of the bottom of the container after decanting of the second food component from the top of the container. The first food component will normally return to a liquid state on heating. However, this does not prevent acid pasteurization of the two-component package food products according to the present invention, since the heating step of the acid pasteurization does not involve shaking or inverting of the products, and therefore does not result in mixing of the first and second food components.

Alternatively, or additionally, the first and second food components may be separated by an edible interfacial layer.

Preferably, the edible interfacial layer is a product of a reaction at the interface between the first and second food components between first and second gel-forming substances present in the first and second food components, respectively. Preferably, the first gel-forming component is a hydrocolloid and the second gel-forming component is a chemical entity that gels or sets the hydrocolloid into an edible polymeric film. The term "hydrocolloid" covers all edible substances that can form a gel in the presence of water. Preferably, the hydrocolloid comprises an edible polymer. For example, the edible polymer could comprise a polysaccharide such as pectin and the gelling agent could comprise acid or base in an amount sufficient to modify the pH of the other food component to bring it into a range in which gelling of the polysaccharide occurs. Gelling of pectin (especially low methoxy pectin) can also be induced by providing a calcium salt in the other food components.

In the embodiments where the first food component is an aqueous sauce and the second food component is an edible oil, then powdered pectin can be dispersed in the edible oil and a calcium salt may be dispersed in the oil phase, or may be dissolved in the aqueous phase. The powdered pectin settles to the oil/aqueous interface, where it interacts with the water and calcium salt to form a gel membrane.

A number of other edible polymers are known that can be gelled or set to form membranes by suitable reagents. For example, it is well known that soluble sodium alginate sets to form a film in contact with aqueous calcium salts. Similar gelling reactions are known for xanthan gum when it is brought into contact with a galactomannan gum, such as locust bean gum or guar gum. Likewise, it is known that aqueous guar gum can be set to a gel by the action of borate ions. Many other suitable reactions between edible components will be known to a skilled reader.

The edible hydrocolloid gel interfacial layer generally has a thickness in the range of from 0.5 mm to 10 mm, depending on the type and concentration of the gel-forming components.

Other edible interfacial layers that may be used in the practice of the present invention include edible wax coated rice papers, collagen containing films, and layers of water-immiscible lipid-protein complexes, such as a lipid-protein emulsion complex applied to the interface by spraying.

Alternatively or additionally, accidental mixing of the first and second food components in the packaged food products according to the present invention is inhibited by providing substantially zero head space inside the container between the container and closure and the first and second food components.

In other words, the first and second food components inside the container substantially entirely fill the container and closure assembly. There is substantially no gas- or vacuum-filled space between the fluid food contents and the container or closure. That is to say, the interior of the container is substantially free from any pocket of gas or vacuum, other than gas bubbles present in a foam layer as hereinafter described. Preferably, at least 99% of the internal volume of the container and closure assembly is filled by food components or foam, more preferably at least 99.8% of the said volume is so filled, and most preferably at least 99.95% of the said volume is so filled.

The elimination of head space can be achieved by a variety of packaging techniques, in addition to careful control of the filling level of the container. For example, the closure may comprise release valve means to allow air to vent from inside the container during acid pasteurization, together with space-filling means to replace the air gap when the packaged food product cools following the acid pasteurization. The space-filling means preferably comprises a portion of the base portion of the closure cap that can undergo plastic formation. The space-filling means can also comprise a layer of dry foam in the base of the cap that hydrates and expands in the acid pasteurization step. The space-filling means can alternatively or additionally comprise a foam producing agent, such as calcium carbonate in one of the food components, that produces microscopic space-filling bubbles during the heat treatment step. An advantage of all such arrangements that rely on space-filling means inside the container is that, when the container is opened, there is a normal-looking head space of 2–10 millimetres between the top of the container and the top of the food products inside. The normal-looking head space makes decanting of the container contents easier, and improves consumer acceptability.

In preferred embodiments, one or both of the food components contains a dispersed foaming agent, such as calcium carbonate particles, that react with acid present in the food components to form bubbles on heating. One or both of the food components also contains a gel forming agent such as pectin. The container is sealed in a conventional way, and then heat treated to stabilize the contents. The heat treatment results in the formation of a semi-solid foam that entirely fills and eliminates the head space of the package.

The absence of a low density pocket of air or vacuum inside the container makes it considerably less likely that gentle agitation of the container will result in mixing of the first and second food components. This is because the first and second food components themselves have generally similar densities, probably densities within about 10% of one another, so that agitating the container results in relatively weak mixing forces on the first and second components. The tendency of the first and second components to mix can be further reduced by providing one or more of the other features of the present invention as described herein.

In order for thermal expansion of the first and second food components during normal thermal cycling and storage temperatures, and in particular during acid pasteurization of the package, the two-component packaged food product according to these preferred embodiments with zero head space preferably comprises means to accommodate thermal expansion of the first and second food components. Preferably, this means is provided on or in the closure. Preferably, the means to accommodate thermal expansion comprises a compressible base portion of the closure. That is to say, the base of the closure facing the interior of the container presents a continuous surface to the food components therein, but can flex outwardly to accommodate expansion of the food components. The compressibility can be provided by a resilient diaphragm, or by a compressible foam body, or by a gas bag inside the base of the closure cap. In alternative preferred embodiments, the means to accommodate thermal expansion comprises an expansion chamber in the cap, with the expansion chamber communicating with the inside of the container through a small aperture. The expansion chamber initially contains a pocket of gas that can be filled or partially filled by expansion of the food components that are inside the container. This small aperture between the inside of the container and the expansion chamber means that the air or vacuum trapped in the expansion chamber does not cause mixing of the first and second food components when the package is agitated.

Preferably, the shape and configuration of the container are selected to minimise accidental mixing of first and second food components during filling, transporting and decanting of the first and second food components.

For example, preferably the cross-sectional area of the container is less in the second region where the second food component is stored than in the first region where the first food component is stored. This results in the presence of a shoulder on the container adjacent to the interface between the first and second regions. The shoulder helps to reduce splashing of the first food component when the second food component is introduced into the container on top of the first food component. The difference in cross-sectional areas of the first and second regions also confers a more attractive visual appearance on the two-component package food product, since the volume of the second food component is generally less than that of the first component, and it is therefore desirable to enhance the visibility of the second food component by placing it in a region of lesser cross-section, so that it occupies a relatively greater height of the container than it would if the container had uniform cross-sectional area.

Preferably, the cross-section of the container in the second region is substantially the same as the cross-section of the opening at the top of the container. More preferably, the opening is substantially circular and the internal cross-section of the container in the second region below the opening is substantially cylindrical, having substantially the same diameter as the opening. Such configurations have been found to be especially suitable for the introduction of vegetable pieces into the second region of the container using a pocket filler, with minimum splash back of the first food component located in the first region of the container when the vegetables are introduced.

The splash back of the first food component in the lower region of the container when the second food component is introduced thereto can be further reduced by providing a circumferential internally projecting rib on the container adjacent to the interface between the first and second regions. The circumferential rib deflects the second food component (especially vegetable pieces) being introduced into the container, and blocks splash back of the first food component.

The present invention also provides a method of food preparation comprising the steps of: providing a packaged food product according to the present invention as hereinbefore described; decanting the second food component from the container and carrying out a first food preparation step with the second food component to obtain an intermediate food product; followed by adding the first food component to the intermediate food product and carrying out a second food preparation step.

Preferably, the first food preparation step comprises cooking the second food component at elevated temperature, more preferably by frying. For example, where the second food component comprises vegetable pieces in edible oil, and the first food preparation step comprises frying the vegetable pieces in the oil as hereinbefore described. More preferably, meat is then added to the oil and vegetable pieces and fried.

In alternative embodiments, the second food component comprises a marinade, and the first food preparation step comprises marinating a meat with the marinade, followed by cooking the meat and adding the first food component.

The present invention further provides a method of making a packaged food product according to the present invention as hereinbefore described, wherein the method comprises the steps of: providing a container having substantially rigid walls and a opening at the top; filling a lower region of the container with aqueous first food component having pH less than or equal to 4.3; followed by depositing vegetable pieces on top of the first food component, the said vegetable pieces being acidified to pH less than or equal to 4.3; followed by adding edible oil based liquid to fill the remainder of the container; followed by applying a closure to the opening to seal the opening; and heat stabilizing the packaged food product to render it shelf-stable.

In a second aspect, the present invention provides a packaged shelf-stable food product comprising vegetable pieces in an edible oil based liquid, wherein the vegetable pieces are acidified with a food-acceptable acid and the edible oil based liquid comprises an emulsifier.

Preferably, the vegetable pieces comprise added reducing sugar, and more preferably the reducing sugar comprises glucose. Preferably, the vegetable pieces comprise at least 1% by weight of added reducing sugar, more preferably at least 2%.

Preferably the vegetable pieces are either raw or blanched, but not cooked.

Preferably, the food-acceptable acid is selected from the group consisting of citric, lactic, acetic and alginic acids. Preferably, the pH of the acidified vegetable pieces is less than or equal to 4.3.

Preferably, the edible oil based liquid consists essentially of one or more vegetable oils. Preferably, the emulsifier comprises lecithin, and preferably the emulsifier is present in an amount of 0.1% to 0.5% by weight based on the weight of the edible oil.

Such shelf-stable packaged vegetable-in-oil products are especially suitable for use as the base for a home-cooked, restaurant-quality sauce product. The vegetables in oil are fried as hereinbefore described to provide the base for a superior quality sauce.

Specific embodiments of the present invention will now be described in detail, by way of example, with reference to the accompanying drawings.

Figure 1:
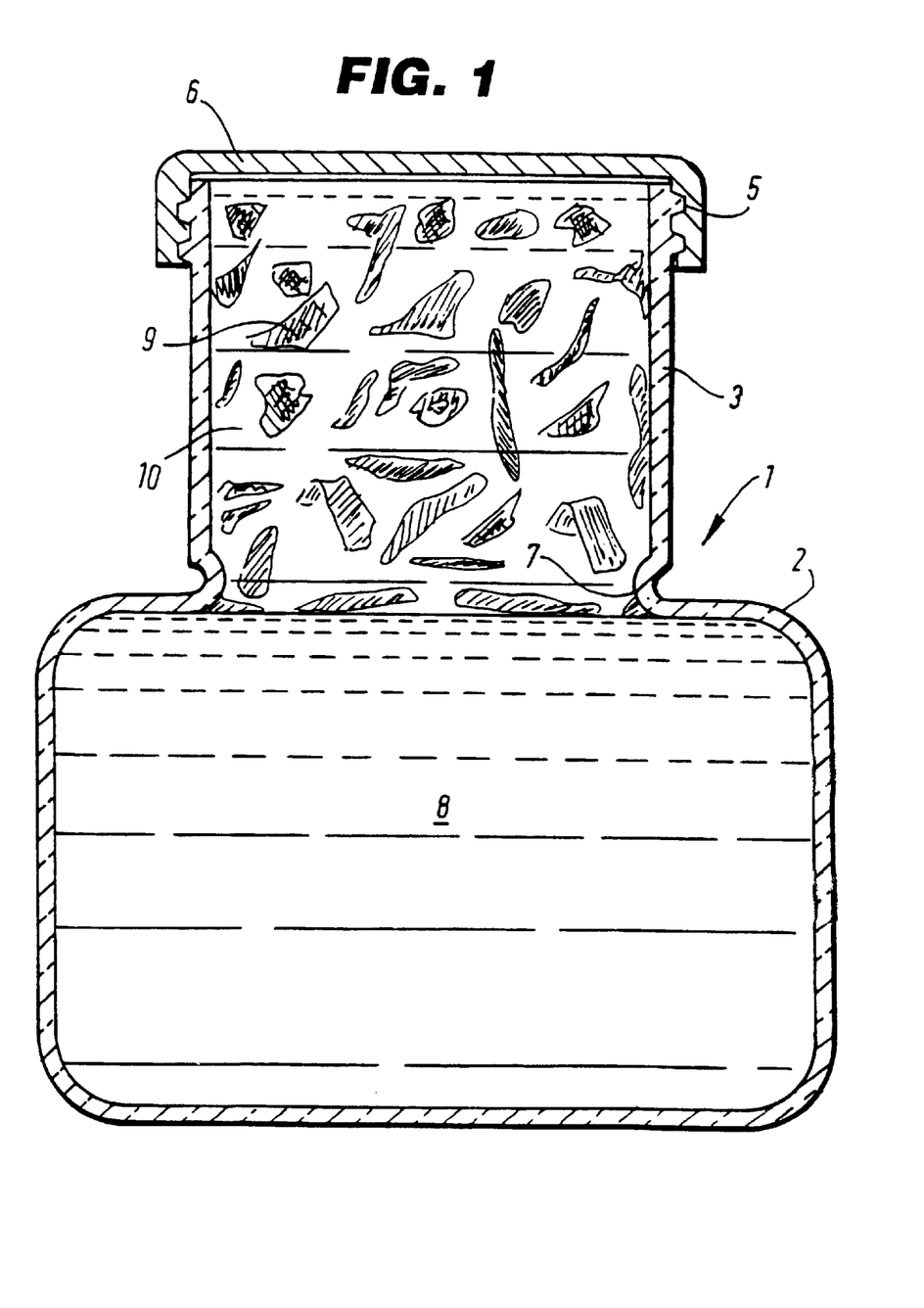
FIG. 1 shows a longitudinal cross section through a first embodiment of the two-component shelf-stable packaged food product according to the present invention.

Referring to FIG. 1, the two-component shelf-stable packaged food product according to the present invention comprises a container 1 of clear glass, formed by blow molding in conventional fashion. The container 1 comprises a lower region 2 of relatively large cross-sectional area, and an upper region 3 of relatively smaller cross-sectional area, with a shoulder 4 between the upper and lower regions. An opening 5 at the top of the container has a cross-section substantially identical to that of the upper region 3, and is sealed with closure cap 6 in conventional fashion. An indented circumferential rib 7 extends around the inside of the container 1 adjacent to the shoulder 4 intermediate the upper and lower regions 2, 3.

An aqueous tomato sauce 8 fills the lower region 2 of the container 1. The tomato sauce 8 has a natural pH less than 4.2. In addition, the tomato sauce 8 is thickened and gelled by the presence of 1% modified corn starch, 0.4% by weight of low methoxy pectin, and 0.02% by weight of calcium chloride as gelling agent, based on the weight of the sauce 8. This results in a tomato sauce 8 having a weakly gelled consistency at ambient temperature.

The upper region 3 of the container 1 is sealed with a mixture of chopped onion, pepper and egg plant pieces 9 having approximate dimension 5 mm, immersed in edible oil 10. The edible oil is a mixture of 90% sunflower oil and 10% olive oil. The oil also contains 0.09% by weight of lecithin based on the weight of the oil. The vegetable pieces have been treated prior to packaging by infusion for five minutes at room temperature in a solution consisting of 50% by weight water, 3% by weight of 50% w/v aqueous lactic acid, and 47% by weight glucose. This results in acidified vegetable pieces incorporating glucose.

The packaged food product shown in FIG. 1 has been acid pasteurized at 95° C. to $P_o$ of 5., and is shelf stable.

The packaged food product of FIG. 1 is prepared as follows. First, a standard aqueous tomato sauce is prepared in conventional fashion as described hereinafter in Example 1. The pectin and calcium chloride gelling agent are mixed into the sauce, and the lower region 2 of the container is then filled with the sauce to a level about 2–5 mm below the shoulder 4. This filling step may be carried out at ambient temperature, or at elevated temperatures at which the sauce 8 is fully liquid, and is preferably carried out at about 50° C.

The container 1 then passes through a pocket filler, in which the treated vegetable pieces 9 are deposited on top of the sauce component 8. Splash back of the sauce is minimized for the following reasons. First, the shoulder 4 on the container 1 deflects the splash back flow of the sauce 8. Second, the indent 7 deflects the downward motion of the vegetable pieces 9 and thereby further reduces splash back. Settlement of the vegetables onto the sauce raises its level to the level of the shoulder 4.

Finally, sufficient of the edible oil component is added to complete filling of the container 1 to a level about 1.5 cm below the top of the container. The container is then capped and pasteurized at 95° C. to a $P_o$ of 5 in conventional fashion, without inversion or agitation.

In use, the oil 10 and vegetable pieces 9 are decanted off the sauce component 8 and fried at high temperature to achieve browning and Maillard reactions. Further vegetables or meat are optionally added and browned in the oil. Finally, the sauce 8 is decanted into the fried oil and vegetables with a spoon, or by shaking, and the combination is mixed together and heated to form the final sauce. The presence of lecithin in the oil achieves rapid and complete mixing of the oil and aqueous sauce components, and heating returns the gelled sauce 8 to a liquid condition. The resulting sauce has home-cooked restaurant-quality organoleptic characteristics.

Figure 2:
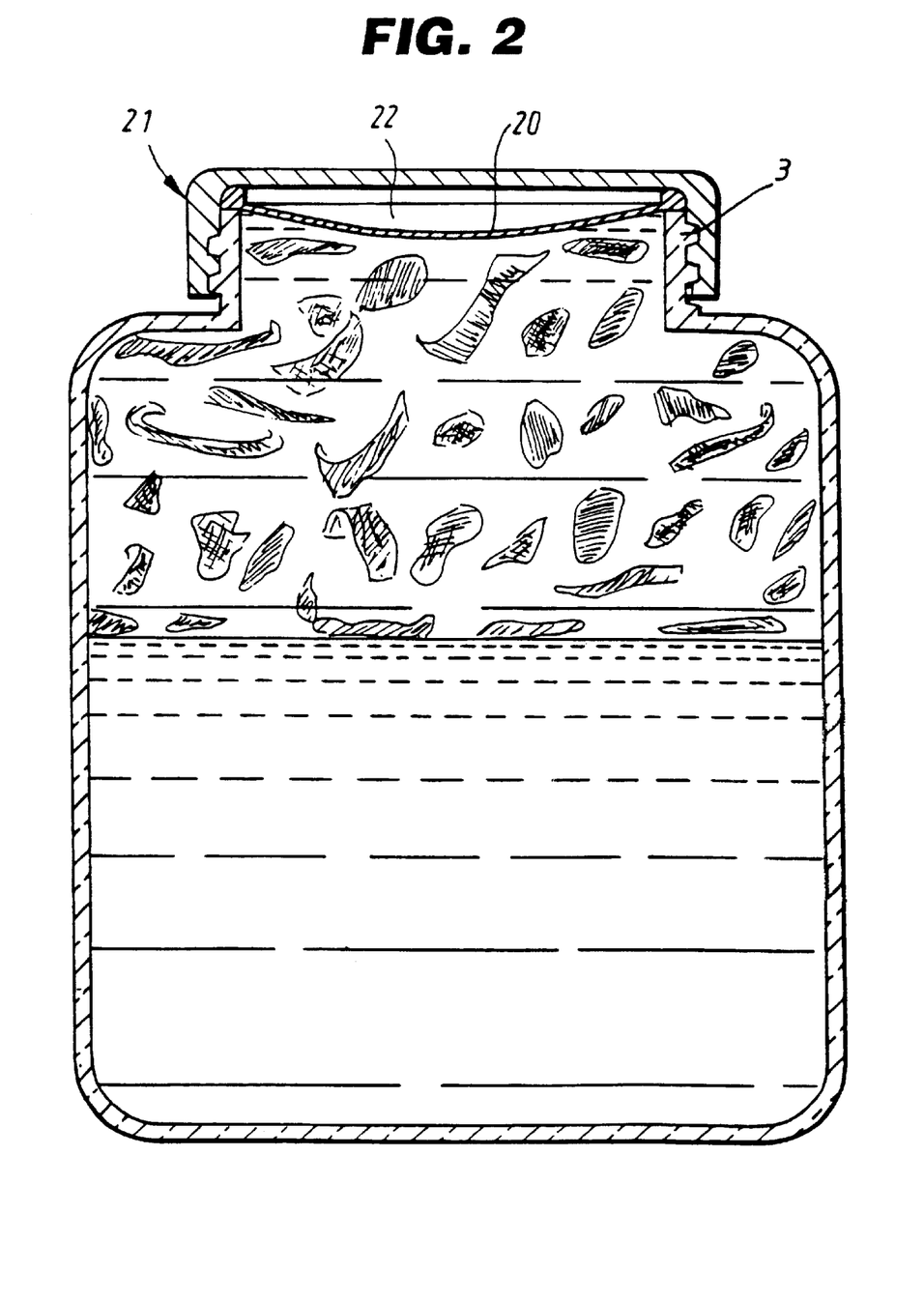
FIG. 2 shows a longitudinal cross section through a second embodiment of the two-component shelf-stable packaged food product according to the present invention.

Referring to FIG. 2, the alternative embodiment shown therein incorporates the feature of substantially zero head space in the container to minimize mixing of the first and second food components when the container is agitated.

Figure 3:
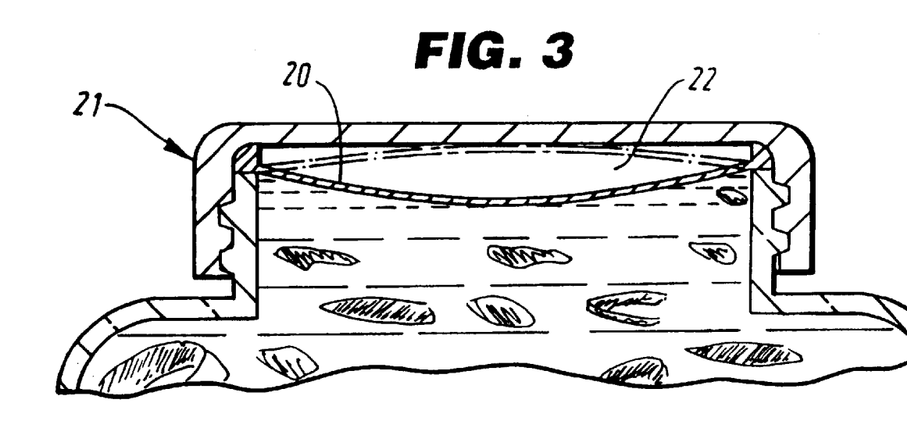
FIG. 3 shows a partial longitudinal cross section through the top of the embodiment shown in FIG. 2.

Zero head space is achieved by providing a plastics diaphragm 20 in the base of the closure cap 21. An air pocket 22 behind the diaphragm 20 is compressible to permit thermal expansion of the container contents, whilst maintaining zero head space, as shown in phantom in FIG. 3.

Figure 4:
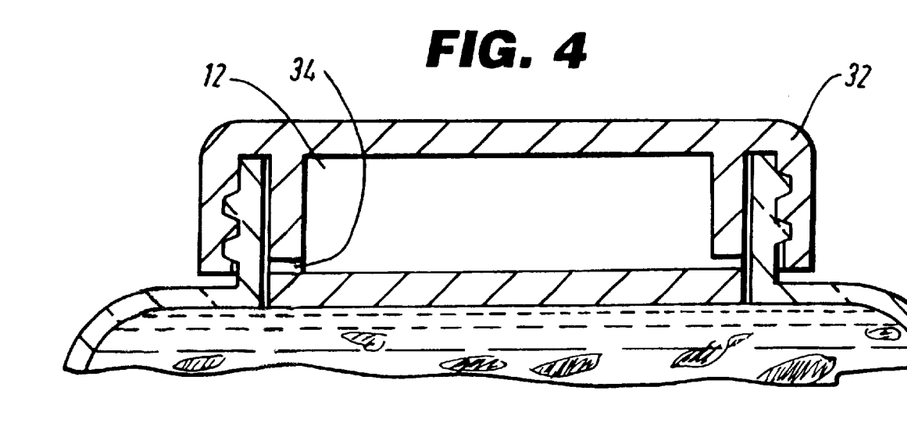
FIG. 4 shows a partial longitudinal cross section through the top of a third embodiment of the two-component shelf-stable package food product according to the present invention.

Referring to FIG. 4, an alternative zero head space concept is shown, wherein thermal expansion of the container contents is accommodated by means of a chamber 30 in the base of the closure cap 32, whereby a container contents can expand into the chamber 30 through pinholes 34.

Further embodiments of two-component shelf-stable packaged food products according to the present invention are illustrated in and by the following examples.

EXAMPLE 1

A two-component shelf-stable package food product comprising an edible interfacial layer between the first and second food components was prepared as follows.

A standard concentrated pasta sauce was prepared by mixing concentrated tomato puree, onions, garlic, herbs, 1% of modified corn starch and 17% added water, to give a natural pH of 3.95. Calcium chloride was dissolved in the sauce in an amount of 0.05% w/w.

A 400 g glass pot was filled with 300 g of the standard concentrated pasta sauce. The jar was topped up to a head space of 1.5 cm with a suspension of 0.5 g low DE pectin (AMP 285 from SPI Benelux) and 0.2 g powdered $CaCO_3$ (Danby Food Ingredients) in 100 g olive oil. The jar was then capped and pasteurized at 95° C. to a $P_o$ of 5. The suspension settles during pasteurization and the pectin, calcium and water from the base sauce combine upon cooling to form a gel layer at the interface between the oil and the water. The gel is red in colour and is visually indistinguishable from the rest of the pasta sauce. The gel layer can simply be stirred into the sauce during cooking.

EXAMPLE 2

A two-component shelf-stable packaged food product according to the present invention, in which zero head space was achieved by filling the head space with a semi-solid foam, was prepared as follows.

To 1 kg of a concentrated pasta sauce as prepared in Example 1 were added 5 g of low DE pectin. Calcium carbonate was dispersed into the mixture at a concentration of 0.35 g per liter. The rest of the components for the sauce were assembled and a jar comprising 75% pasta sauce on the bottom layer and 25% olive oil and vegetable mix in the upper layer was filled with a standard head space of 1.5 cm, and the jar was capped. The average fill temperature was 50° C.

The sauce was pasteurized at 95° C. for a $P_o$ of 5. During pasteurization, $CO_2$ formed by the reaction of the calcium carbonate with the acid in the sauce formed a mousse structure. The head space in the jar was reduced to less than 3 mm. During cooling, the mousse structure was set by gelification of the pectin the presence of calcium cations to form a stable structure.

Upon opening the jar, the slight vacuum established in the jar during the warm filling is reduced and the mousse contracts slightly. This has the effect of settling the product to a head space of around 1 cm. The reaction of the calcium carbonate increases the pH of the sauce from 3.95 to 4.12.

The above embodiments have been described by way of example only. Many other embodiments falling within the scope of the accompanying claims will be apparent to the skilled reader.

What is claimed is:

1. A two-component shelf-stable packaged food product comprising:
   a container having substantially rigid walls and an opening for filling and emptying the container;
   a first food component filling a first region of the container remote from said opening wherein the first food component is an aqueous sauce;
   a second food component different from the first food component and filling a second region of the container adjacent to said opening;
   wherein said second food component either directly contacts said first food component, said first food component including a thickening or gelling agent or second food component is separated from said first food component by an edible interfacial layer;
   wherein the second food component is an edible food component that includes edible pieces selected from a group consisting of solid vegetable pieces, solid meat pieces and mixtures thereof distributed in an edible oil that can be decanted off the first food component through said opening; and
   said second and first food components being adapted for use in combination in sequential food preparation steps.

2. A packaged food product according to claim 1, wherein the solid vegetable pieces are selected from the group consisting of onion, garlic, carrot, peppers, eggplant, or mixtures thereof.

3. A packaged food product according to claim 1, wherein said solid edible pieces occupy from 20% to 80% of the volume of said second food component.

4. A packaged food product according to claim 1, wherein said solid vegetable pieces are acidified with a food-acceptable acid.

5. A packaged food product according to claim 4, wherein the pH of said solid vegetable pieces is less than or equal to 4.3.

6. A packaged food product according to claim 1, wherein the vegetable pieces comprise added reducing sugar.

7. A packaged food product according to claim 6, wherein the added reducing sugar comprises added glucose.

8. A packaged food product according to claim 1, wherein the edible oil comprises an emulsifier.

9. A packaged food product according to claim 8, wherein the emulsifier is lecithin in an amount of from 0.05% w/w to 0.5% w/w, based on the weight of the edible oil in the second food component.

10. A packaged food product according to claim 1, wherein the thickening or gelling agent causes the first food component to be thickened or gelled sufficiently to inhibit mixing of the first and second food components during filling and transporting of the two-component package, and during decanting of the second food component.

11. A packaged food product according to claim 10, wherein the thickening or gelling agent is selected from the group consisting of pectins, alginates, guar gum, gum tragacanth, gum arabic, gelatin, starch, starch derivatives, and mixtures thereof.

12. A packaged food product according to claim 11, wherein the gelling agent comprises pectin gelled with a calcium salt.

13. A packaged food product according to claim 1, wherein the first food component is an aqueous food component that has a pH less than or equal to 4.3.

14. A packaged food product according to claim 1, wherein the second food component is a marinade component and the first food component is an aqueous sauce component.

15. A packaged food product according to claim 1, wherein the first and second food components are packaged in direct contact with each other.

16. A packaged food product according to claim 1, wherein the first and second food components are separated by an edible interfacial layer.

17. A packaged food product according to claim 16 wherein the edible interfacial layer is the product of a reaction between a hydrocolloid present in one of the first and second food components, water, and a gelling agent present in the other of the first and second food components.

18. A packaged food product according to claim 17, wherein the hydrocolloid comprises a polysaccharide selected from the group consisting of pectin, alginate xanthan gum, guar gum and locust bean gum.

19. A packaged food product according to claim 17, wherein the hydrocolloid comprises a pectin and the gelling agent comprises a calcium salt.

20. A packaged food product according to claim 17, wherein the polysaccharide comprises xanthan gum and the gelling agent comprises a galactomannan.

21. A packaged food product according to claim 16, wherein the edible interfacial layer comprises a water-immiscible lipid-protein membrane.

22. A packaged food product according to claim 1, wherein there is substantially zero head space inside the container between the container and closure and the first and second food components, whereby mixing of the first and second food components when the container is agitated is reduced.

23. A packaged food product according to claim 22, wherein the container having the closure secured thereto comprises means to accommodate thermal expansion of the first and second food components.

24. A packaged food product according to claim 23, herein the means to accommodate thermal expansion comprises a compressible base portion of the closure.

25. A packaged food product according to claim 23, wherein the means to accommodate thermal expansion comprises an expansion chamber in the closure communicating with the inside of the container.

26. A packaged food product according to claim 22, comprising a layer-of a stable foam.

27. A packaged food product according to claim 1, claim, wherein the cross-sectional area of said container is less in said second region than in said first region.

28. A packaged food product according to claim 27, wherein the cross-section of said container in said second region is substantially the same as the cross-section of said opening.

29. A packaged food product according to claim 27, wherein the container further comprises a circumferential inwardly projecting rib adjacent to the interface between said first and second regions to inhibit mixing of said first and second food components during filling of the container.

30. A method of food preparation comprising the steps of:
providing a packaged food product according to claim 1;
decanting said second food component from said container and carrying out a first food preparation step with said second food component to obtain an intermediate food product; followed by
adding said first food component to said intermediate food product with mixing and heating in a second food preparation step.

31. A method of food preparation according to claim 30, wherein said second food component comprises vegetable pieces in edible oil, and said first food preparation step comprises frying the vegetable pieces in the oil.

32. A method of food preparation according to claim 31, wherein said first food preparation step further comprises adding meat to the oil and vegetable pieces, and frying the meat.

33. A method of food preparation according to claim 31, wherein said first food preparation step comprises adding rice to the oil and vegetable pieces and frying the rice, and said second food preparation step comprises cooking the rice with sufficient liquid to hydrate the rice.

34. A method of food preparation according to claim 30, wherein said second food preparation step comprises adding water, stock or milk to the first and second food components.

35. A method of food preparation according to claim 30, wherein said second food component comprises a marinade, and said first food preparation step comprises marinating a meat with the marinade.

36. A method of making a packaged food product of claim 1, said method comprising the steps of:
providing a container having substantially rigid walls and an opening at the top;
filling a lower region of said container with an aqueous first food component having a pH less than or equal to 4.3, the first food component including a thickening or gelling agent; followed by
depositing vegetable pieces on top of the first food component, said vegetable pieces being acidified to a pH less than 4.2; followed by
adding an edible oil based liquid to fill the remainder of the container; followed by applying a closure to said opening to seal the opening; and
heat stabilizing the packaged food product to render it shelf-stable.

37. The method of making a packaged food product according to claim 36, wherein the thickening or gelling agent causes the first food component to be thickened or gelled sufficiently to inhibit mixing of the first and second food components during filling and transporting of the two-component package, and during decanting of the second food component.

* * * * *